May 26, 1959   F. R. PRESCOTT ET AL   2,887,738
SEALING MEANS FOR GLAZING UNIT
Filed July 12, 1954

INVENTORS
FRANK R. PRESCOTT
and WILLIAM R. BAUER
Oscar L. Spencer
ATTORNEY

United States Patent Office 2,887,738
Patented May 26, 1959

2,887,738
SEALING MEANS FOR GLAZING UNIT

Frank R. Prescott, New Kensington, and William R. Bauer, Natrona Heights, Pa., assignors to Pittsburgh Plate Glass Company Application July 12, 1954, Serial No. 442,632

4 Claims. (Cl. 20—56.5)

This invention relates to an improvement in multiple glazed units that comprise at least two spaced sheets of glass that are united around their peripheries by a peripheral strip. In particular, this invention relates to improved pore opening seals to be used in conjunction with such assemblies.

Conventionally, units of the type described above are fabricated by holding two sheets of glass slightly apart and heating the peripheral portion of the glass sheets until they fuse. This fusing is usually accomplished by passing an electric current through a thin film of graphite placed around the periphery of the glass in order to impart sufficient heat to the glass to heat it to fusing temperature. The graphite strip is vaporized at the high temperature produced and the glass periphery itself becomes electrically conductive while the glass is being fused. Before the glass is allowed to cool, the two sheets are further separated by means such as suction. A typical method of forming such an assembly known commonly as an all-glass unit, is described in U.S. Patent No. 2,-624,978 issued to Frederick R. Hohmann.

It is necessary that the assembly be allowed to breathe during fabrication, and for this purpose, a small opening known as a pore hole, is drilled adjacent the corner of one of the glass sheets comprising the assembly. This provision for breathing is made in order to prevent failure of the unit due to a large pressure differential that would otherwise be established between the outside atmosphere and the air contained within the assembly when the individual glass sheets are separated.

The most difficult problem to overcome in the utilization of all glass units has been the provision of a suitable seal to close the pore hole required during fabrication of the assembly.

In order for a seal closing the pore hole to be acceptable, it must provide a closing that is both water and air tight and inhibits the passage of dust and dirt into the space enclosed by the glass sheets. The necessity for a water impervious seal is obvious. The presence of water vapor within the window assembly causes fogging of the inner surface of the sheet exposed to a temperature below the dew point of the air within the assembly. This reduces the transparency of the assembly. Therefore, it is necessary before the pore hole is sealed that dry air be inserted within the air chamber enclosed by the assembly.

Since glass is able to withstand considerable compressive forces but fractures easily upon the application of tensile stresses, it has been found advisable to force dry air within the assembly under pressure before the pore hole is sealed, thus applying a compressive force to the outer surface of the assembly in the vicinity of the periphery. When the assembly is subjected to temperature and pressure variations during use, the tendency of the outer surface of the assembly to be placed in tension is compensated for by the prestressing of the unit due to the introduction of the dry air under pressure at the time the pore hole is sealed. For most operations a pressure of slightly above one atmosphere has been found to be most suitable for providing sufficient stress compensation for the range of temperature and pressure variations to which these units can be expected to be subjected. Thus, a suitable pore hole seal is required to be strong enough to maintain the dry air within the assembly under pressure.

Accordingly, it is an object of the present invention to provide improved sealing means for the pore hole of an assembly of the type described hereinabove.

Another object is to provide an improved unitary window unit of substantially homogeneous structure enclosing an air space.

A further object of the invention is to provide a pore closure structure which can be formed at approximately room temperature without requiring heating of the entire multiple glazed unit.

These and other objects of the present invention have been attained by providing a novel seal for the pore hole. This seal may take various forms, but each embodiment of the present invention is characterized by a seal located in a recessed position with respect to the outer surface of the sheet of glass containing the pore opening. This recessing has been accomplished both by providing a specially designed recessed aperture for maintaining the seal in a desired location and also by designing a seal capable of being maintained in a recessed position within a pore hole. Such seal comprises an element having an opening therein which is more easily sealed than the pore opening in the glass itself.

Figure 2:
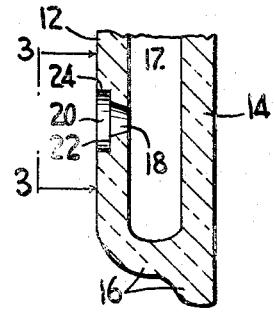
Figure 2 is a cross-sectional view of a portion of the unit depicted in Figure 1 and taken along lines 2—2 of Figure 1.

Figures 3 to 6 inclusive, are enlarged cross-sectional views of various embodiments of the present invention taken along the lines 3—3 of Figure 2.

Figure 1:
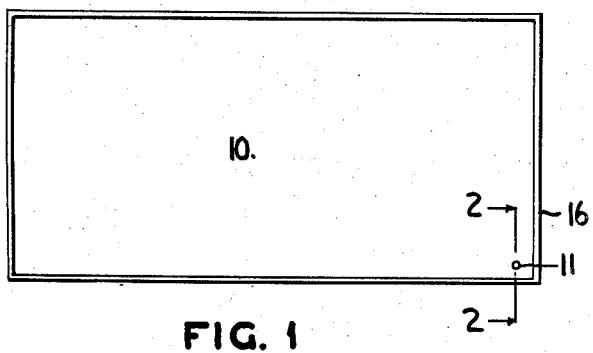
Figure 1 represents a plan view of a multiple sheet glass unit provided with a pore hole, the seal for which is the subject matter of the present invention.

A typical multiple glazed unit is depicted by reference numeral 10 in Figure 1. This assembly 10 is provided with a pore hole 11 which is required to be sealed and which will be described in greater detail below. Glass panes 12 and 14 (Figure 2) connected around their periphery by a peripheral glass portion 16 enclose a space 17 within the assembly. The pore hole 11 is shown as a substantially completely tapered aperture 18. Adjacent the outer surface of pane 12 is an offset portion 20. The offset portion is provided with an inner circular shoulder 22 substantially parallel to the outer surface of the glass and a peripheral circular portion 24 substantially perpendicular to the outer surface of the glass.

The recessed pore hole 11 should be made prior to assembling the unit. It is possible to prepare the recessed pore hole by first cutting a tapered hole and then enlarging the upper portion of the hole by means of a dimet drill to form the shoulder 22 a desired distance below the surface. Another method of forming this recessed opening is by drilling with a specially shaped diamond dust impregnated metal drill. It is important that the narrowest portion of the opening 11 have a diameter not substantially less than 0.1 inch in order to allow free flow of air between space 17 and the atmosphere during fabrication of the unit.

The provision of an opening 11 wider at its outer end than its inner end enables one to insert the sealing member with ease. The line where the member is supported within the opening is termed the shoulder. This shoulder is preferably formed parallel to the outer surface of the sheet in order to properly orient the member as well as to recess the latter within the opening.

Figure 3:
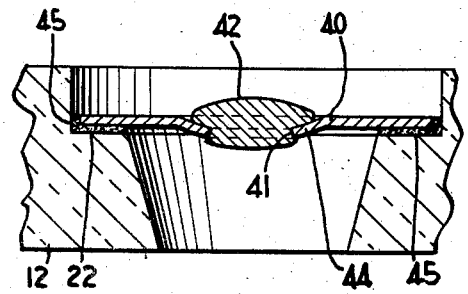

In the embodiment disclosed in Figure 3, a metallic washer 40 is adhered to the shoulder of the offset portion 20 by means of a suitable adhesive. The central opening 41 in the metal washer 40 is closed by means of solder 42 that is applied in a conventional manner. In order to provide additional surface contact for the solder and also to guide the solder into the central opening of the washer 40, the central portion of the washer may be provided with an inwardly directed peripheral lip 44 in the manner shown in the drawing.

The washer is sealed to the shoulder of the offset portion by means of a suitable lead, boron, silica glass frit 45 to which alumina may be added. When the closure member is inserted into the opening 18 during the assembly of the unit, additional localized heating is needed around the periphery of the opening to melt the frit that initially separates the closure member and the wall of the opening. The frit may be softened sufficiently to adhere to the sides of the opening 18 by heating it to a temperature in the range of 1200° to 1600° F. This frit, upon flowing and subsequently solidifying when the additional heat is removed, forms a firm bond between the closure member and the wall of the opening. Next, the central portion of the closure member is cleaned by means of a small abrasive tool to remove any oxide or frit that is present. Tinning of this surface may then be done in the conventional way, using a suitable flux and solder.

Dry air is blown into the chamber 17 through a narrow tube in such a manner that a circulation of air within the chamber is established so that the moist air contained in the chamber is removed via the aperture 18. The fluxing, tinning and blowing operations are all performed at the proper pressure conditions in order to insure the formation of a unit having its outer peripheral surface under a compressive rather than a tension stress. Excessive flux should not be used so as to avoid spattering on the glass sheet opposite the aperture.

Special care must be taken in applying the washer to the pore hole to insure that the washer is centrally located in the recess portion. This precaution is necessitated by the tendency of the glass frit to crack in the region where the washer is spaced farthest from the peripheral wall 24 due to the unequal stress applied to frit when the washer is not properly centered.

In applying the solder to the washer in sealing the pore hole, the entire assembly is first laid flat with the pore hole facing upwardly. Thus, the inwardly directed peripheral lip directs the flow of hot solder downwardly toward the hole in the washer. Upon cooling, the solder is completely sealed to a comparatively large surface area of the washer and provides a seal for the hole of washer.

A typical washer for use with a pore hole provided with a countersunk portion having a diameter of ¼ inch and 0.05 inch deep is between 0.005 and 0.045 inch thick and 0.24 inch in diameter and is provided with a central aperture 0.1 inch or larger in diameter. Of course, these dimensions may be varied without departing from the scope of the invention.

Figure 4:
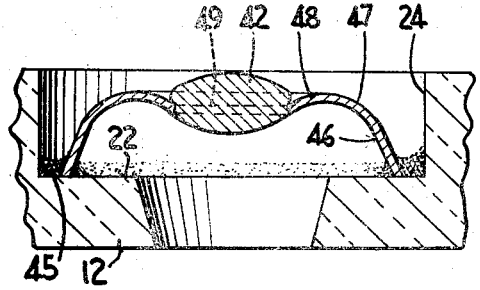

The modification shown in Figure 4 is similar to that shown in Figure 3 in that the ultimate seal is provided by solder. In lieu of a flat washer, a washer 46 that is rounded in cross-section is provided in order to facilitate the application of the solder. For a pore hole having a counterbore 0.25 inch in diameter and 0.08 inch in depth, for example, a rounded washer 0.22 inch in diameter having a height of 0.06 inch and a central aperture 0.1 inch in diameter has been found suitable. The peripheral portion of the rounded washer is united to the shoulder portion of the offset by means of a glass frit 45. A wall portion extends at an acute angle to the peripheral wall 24 of the offset portion of the pore hole from the circular line of contact of the rounded washer with the shoulder 22. The outermost portion of the washer 46 of Figure 4 forms a rounded portion 47 that is provided with an inwardly turned lip 48 which provides a surface area for contacting the solder 42 which closes the central opening 49 of the washer.

The washers used in the embodiments shown in Figures 3 and 4 are preferably made of 4750 metal having a thickness range between .005 and .020 inch. Such metal is an alloy containing 47 percent by weight of nickel, 50 percent by weight of iron and 3 percent of metals such as aluminum, silicon and other materials employed to vary the coefficient of thermal expansion of the alloy. However, the invention is not limited to these particular materials and thicknesses. Washers made of a material having an expansion coefficient compatible with glass and which are "wet" by solder are suitable.

The glass frit 45 extends completely around the inner portion of the tapered wall 46 and seals that portion of the washer to the shoulder 22 and wall portion 24 of the recessed portion 20 of the pore hole 11. It is also contemplated that low melting alloys of tin, lead, cadmium, indium and antimony among others may be employed in lieu of glass frit 45. Further, the washer may be made out of glass or metal or other vapor impermeable material and be sealed with adhesive materials other than solder. The washers may be bonded to the sheet provided with the opening 11 either before, during or after the assembly of the unit. Usually this is accomplished during the preheating of the glass sheets prior to their being welded together.

It is characteristic of the seal shown in Figure 4 that the final seal is made at room temperatures by soldering without developing stresses of a magnitude that would destroy the original glass to metal seal formed at the periphery of the washer. The shape of the washer is rounded to provide an easily accessible position for the introduction of solder to complete the seal, and to relieve stresses formed during the application of the molten solder that tend to peel the rounded washer member from the wall of the opening. The latter purpose is the more important one served by the unique structure of this closure member and is rendered possible by the relatively long distance between the area of application of hot solder and the area of contact between the washer and the periphery of the glass opening compared with the thickness of the washer 46. Therefore, any strain caused by the temperature differential between these two areas due to heating the central portion during the application of solder is readily relieved by a twisting of the thin washer rather than a separation of the washer from the glass.

Figure 5:
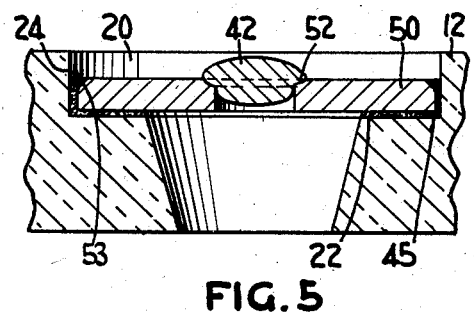

Figure 5 illustrates a modification of the washer 40 set forth in Figure 3. Here a relatively thick washer 50 is employed as compared to the relatively thin washer 40 of Figure 3. In this instance, the inner periphery 52 is tapered on the side of the washer away from the chamber 17 so as to provide a seal for solder 42. The washer 50 is adhered to the offset portion 20 by means of glass frit 45. A further modification of the element 50 shows the outer periphery 53 of the element tapered so as to provide a peripheral channel for containing excess frit. This channel aids in preventing excess frit from flowing over the exposed surface of the washer and closing the opening in the element.

In order to apply solder 42 to the central opening 49 of the washer 40, it is necessary that the upper surface of the washer (as seen in the drawing) be free of glass frit in the vicinity of its central opening. This is easily accomplished by abrading with a suitable abrasive tool followed by tinning with a flux and solder such as described above.

Figure 6:
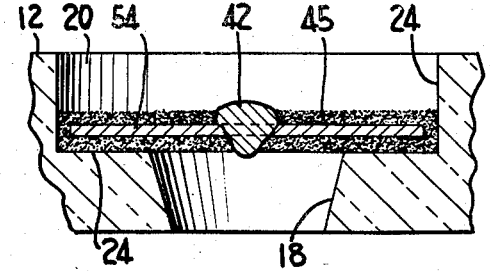

Figure 6 discloses a cross-sectional view of an embodiment similar to that of Figure 3, except that the metallic washer 54 is substantially completely encased in glass frit 45. The latter, upon application of localized heat, seals the metallic washer 40 to the shoulder 22 of the recessed portion 20 of the pore hole in glass sheet 12 of the assembly 10. The provision of glass frit on both inner and outer surface of the metal washer enhances the effectiveness of the seal between the glass pane 12 and the washer 40. Furthermore, the layer of frit 45 on the outermost side of the washer has a reinforcing effect on the seal by inhibiting the tendency of the thin metal washer to curl away from the frit. This reinforcing effect is a function of the thickness of each coating of glass frit both outside and inside the metal washer 40.

The washer may be coated with frit on one side only as shown in Figures 3, 4, and 5 or on both sides as shown in Figure 6. In either case, the washer must be cleaned in order to remove the oxide coating or the frit, respectively, from the vicinity of the central aperture prior to soldering.

It is desirable that the washer have a coefficient of expansion that is compatible with glass. Hence, the use of 4750 metal is desirable. However, 4750 metal is subject to oxidation and forms a coating that is not compatible with solder. This difficulty may be overcome by cladding the 4750 with a thin film of a metal difficult to oxidize, such as gold, silver, or platinum for example, in order to provide a non-oxidizable surface to which solder adheres without too much difficulty, as well as abrading and tinning the oxide coating just prior to the application of solder.

It will be understood that the embodiment disclosed in Figure 6 may be varied in the manner shown for the embodiment illustrated in Figure 3. For example, a centrally disposed lip may be included to facilitate the application of solder and to provide an enlarged surface area to which the solder adheres. The shape of the Figure 6 washer may be modified to that shown in Figures 4 or 5 and still remain within the framework of the present invention.

By the provision of an offset portion to the pore hole, it has become possible to adhere various types of seals to the shoulder of the offset portion thereby enabling the entire glass assembly to be free of any protrusion on its outer surface no matter what shape of closure member is provided, as long as the height of the closure member does not exceed the thickness of the offset portion. Thus assemblies of the type described may be shipped without fear of loosening the pore hole seal in transit. Also, special instructions need not be provided to glazers to avoid their damaging the seal by scraping with their glazing tools, since the glazing tool now glides over the portion of the assembly containing the pore hole without scraping due to the relatively small diameter of the pore hole compared to the width of the glazing tool.

The use of an element having an opening therein, such as a washer as described above, provides an opening for a multiple glazed unit which can be sealed much easier and much more securely than the original pore opening in the glass and preferably at room temperature. The problems attendant to the use of adhesives requiring heat to form a seal, such as fracture of the glass, are greatly minimized. Sealing of the element properly in the pore opening in the glass is greatly facilitated by forming the pore opening so as to have the recessed design described above.

It is understood that the scope of the present invention is not limited to the specific embodiments described above, but also extends to any modifications that become apparent upon reading this description and which are included within the scope of the accompanying claims.

The use of an element having an opening therein, such as a washer as described above, provides an opening for a multiple glazed unit which can be sealed much easier and much more securely than the original pore opening in the glass. The problems attendant to the use of adhesives requiring heat to form a seal, such as fracture of the glass, are greatly minimized. Sealing of the element properly in the pore opening in the glass is greatly facilitated by forming the pore opening so as to have the recessed design described above.

It is understood that the scope of the present invention is not limited to the specific embodiments described above, but also extends to any modifications that become apparent upon reading this description and which are included within the scope of the accompanying claims.

We claim:

1. A pore hole seal for a window structure having two spaced glass sheets enclosing a chamber comprising in combination an opening of varying cross-section extending between opposite faces of one of the sheets, said opening being formed of an enlarged recessed outer portion extending inwardly from the outer surface of the sheet, a circular shoulder substantially parallel to the outer surface of said one sheet at the innermost end of said recessed outer portion and an inner portion extending from the shoulder to the inner surface of the sheet, said inner portion being smaller in cross-section than the outer portion, a plate-like element having a central aperture therein of smaller cross-section than the inner portion of the opening, said element being hermetically sealed to the shoulder but not to the inner portion of the opening and means for hermetically sealing the aperture in the plate-like element.

2. A pore hole seal as described in claim 1 wherein the means for sealing the aperture in the plate-like element is solder which is spaced from and out of contact with the seal between the plate-like element and the shoulder of the pore opening.

3. A pore hole seal as described in claim 2 wherein the plate-like element is provided with a centrally disposed lip for the application of the solder.

4. A pore hole seal as described in claim 1 wherein the plate-like element is hermetically sealed to the shoulder by means of a low softening point glass.

References Cited in the file of this patent

UNITED STATES PATENTS

| | | |
|---|---|---|
| 2,683,906 | Nevins | July 20, 1954 |
| 2,686,342 | D'Eustachio | Aug. 17, 1954 |
| 2,689,924 | Honing et al. | Sept. 21, 1954 |
| 2,749,579 | Shaw | June 12, 1956 |